US005464088A

United States Patent [19]
Koerber

[11] Patent Number: 5,464,088
[45] Date of Patent: Nov. 7, 1995

[54] CONVEYOR DIVERTER SYSTEM

[75] Inventor: Gregory K. Koerber, Appleton, Wis.

[73] Assignee: Valmet-Appleton, Inc., Appleton, Wis.

[21] Appl. No.: 216,058

[22] Filed: Mar. 22, 1994

[51] Int. Cl.$^6$ .................................................. B65G 47/46
[52] U.S. Cl. ................. 198/370.07; 198/364; 198/464.2
[58] Field of Search .................................... 198/364, 372, 198/502.3, 464.2, 468.1, 457

[56] References Cited

U.S. PATENT DOCUMENTS

| | | | |
|---|---|---|---|
| 2,610,748 | 9/1952 | Larham | 198/502.3 |
| 3,096,871 | 7/1963 | Anderson | 198/464.2 |
| 3,242,342 | 3/1966 | Gabar | 198/464.2 |
| 3,515,254 | 6/1970 | Gary | 198/502.2 |
| 3,771,648 | 11/1973 | Revuelta | 198/364 |
| 3,791,518 | 2/1974 | Vanderhoof | 198/364 X |
| 3,955,678 | 5/1976 | Moyer | 198/597 |
| 4,643,291 | 2/1987 | Counter et al. | 198/356 |
| 4,850,471 | 7/1989 | Annas, Sr. et al. | 198/349.3 |

*Primary Examiner*—James R. Bidwell
*Attorney, Agent, or Firm*—Rockey, Rifkin and Rtyher

[57] ABSTRACT

The delivery system of the invention is able to deliver articles transversely from a conveyor with a minimum spacing between articles and a greatly simplified centering mechanism. The system consists of a first conveyor for moving a plurality of closely spaced articles. A second conveyor is located adjacent to the first conveyor for receiving articles delivered transversely from the first conveyor. A kicker is provided that has an optical sensor at the leading edge thereof for sensing the article to be conveyed. Operation of the system begins with the kicker in its start position where the optical sensor is aligned with the center of the second conveyor. When the sensor detects the leading edge of the article, it is moved parallel to and at the same speed as the first conveyor, but in the opposite direction. When the sensor detects the trailing edge of the article to be conveyed, the article is centered relative to the second conveyor, the first conveyor is stopped, and the kicker is activated to push the article transversely from the first conveyor to the second conveyor. Once the article has been transferred to the second conveyor, the kicker is retracted to its start position with a velocity component in the same direction and speed as the conveyor which decreases the cycle time because the conveyor can be started while the kicker is being retracted.

14 Claims, 3 Drawing Sheets

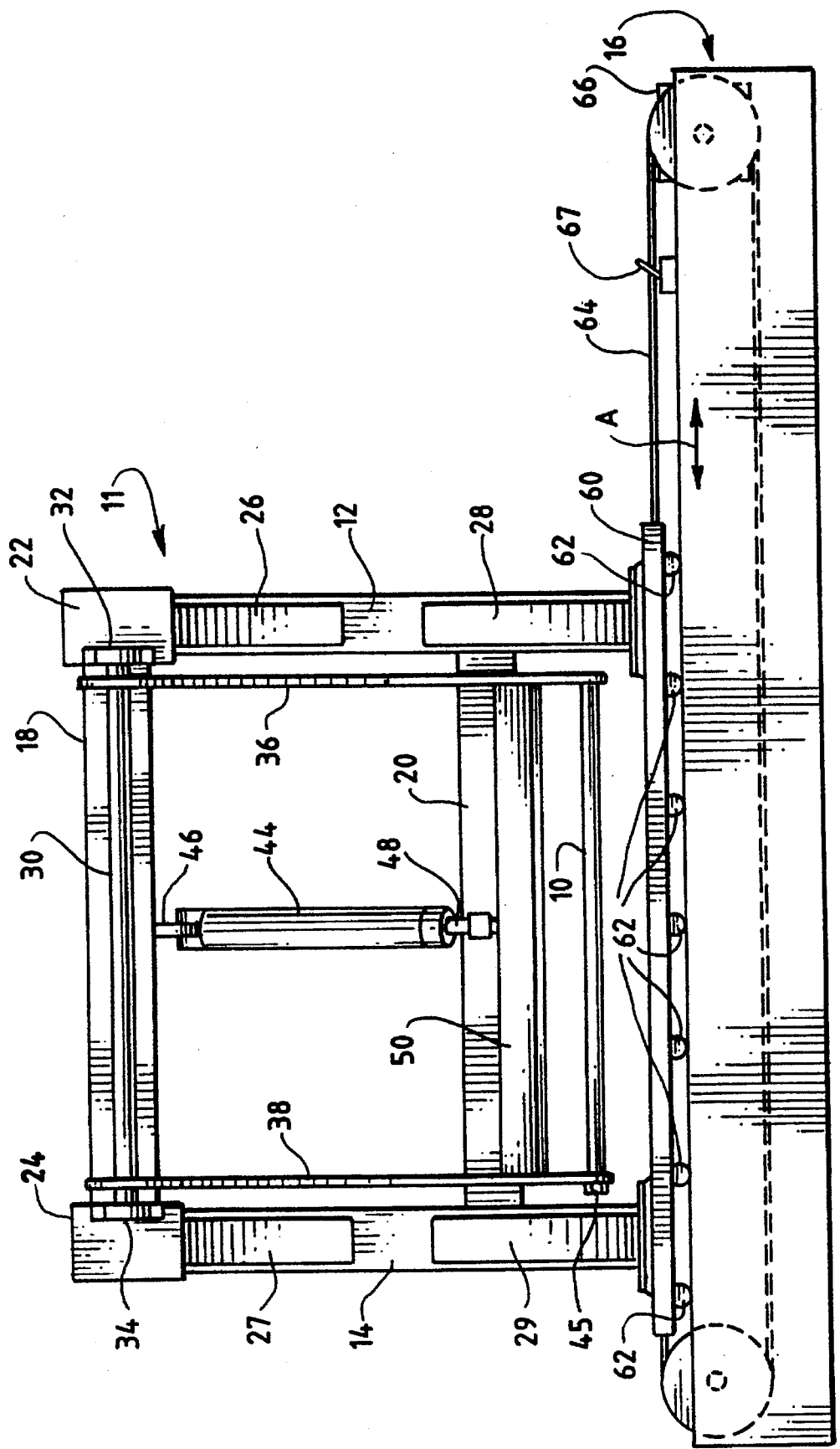

CONVEYOR DIVERTER SYSTEM

BACKGROUND OF THE INVENTION

The invention relates, generally, to material handling systems-and, more particularly, to an improved system for diverting articles from a conveyor.

Material handling systems are used in a wide variety of applications and often include conveyors with moving belts, power driven rollers or the like for transporting objects of various sizes and shapes along a path. It is also common for these systems to include branch or auxiliary conveyors, chutes, ramps, work stations or the like arranged adjacent to the conveyor. Diverters or pusher arms are provided to push the articles transversely from the conveyor onto the branch or auxiliary conveyors, chutes, or ramps.

In the existing systems, it is usually necessary to space the articles on the conveyor a distance sufficient to allow the pusher to retract between pushing successive articles. As a result, the cycle time is relatively long and the number of articles that can be conveyed and diverted per unit time is relatively small. Moreover, it is typically desirable to center the article relative to the auxiliary or branch conveyor before diverting it to ensure that the article is properly aligned thereon. In existing systems locating the center of an article typically includes the use of a plurality of sensors and complex mathematical calculations.

U.S. Pat. No. 3,242,342 issued to Gabar discloses a typical prior art method for locating the center of an article and diverting it transversely from a first conveyor to a transverse conveyor. It is necessary to space the articles by a dead space "d" to ensure that the diverter does not inadvertently contact a downstream article when diverting the upstream article onto the transverse conveyor. This dead space lessens the capacity of the system. Moreover, the method and apparatus for determining the centers of the articles requires a plurality of sensors and complex controls.

Another example of a transverse sorting and conveying system is shown in U.S. Pat. No. 3,955,678 issued to Moyer and requires sophisticated computer and mathematical processes to determine the center of the articles. The Moyer system also spaces the articles before sorting by intermittently running a pacing conveyor to control the spacing of the articles on the sorting conveyor.

Thus, an improved conveying system for delivering articles transversely that minimizes the spacing between the articles and simplifies the procedure for locating the centers of the articles is desired.

SUMMARY OF THE INVENTION

The delivery system of the invention is able to deliver articles transversely from a conveyor with a minimum spacing between articles and a greatly simplified centering mechanism. The system consists of a first-conveyor for moving a plurality of closely spaced articles. A second conveyor is located adjacent to the first conveyor for receiving articles delivered transversely from the first conveyor. A kicker is provided that has an optical sensor at the leading edge thereof for sensing the article to be conveyed. Operation of the system begins with the kicker in its start position where the optical sensor is aligned with the center of the second conveyor. When the sensor detects the leading edge of the article, it is moved parallel to and at the same speed as the first conveyor, but in the opposite direction. When the sensor detects the trailing edge of the article to be conveyed, the article is centered relative to the second conveyor, the first conveyor is stopped, and the kicker is activated to push the article transversely from the first conveyor to the second conveyor. Once the article has been transferred to the second conveyor, the kicker is retracted to its start position with a velocity component in the same direction and speed as the conveyor which decreases the cycle time because the conveyor can be started while the kicker is being retracted.

BRIEF DESCRIPTION OF THE DRAWINGS

FIG. 2 is a front view of the kicker of the invention.

DETAILED DESCRIPTION OF THE INVENTION

The diverter system of the invention can be used in any application where conveyed articles are to be diverted, such as automated material handling systems found in warehouses, airline baggage systems, factories, shipping rooms, delivery services and the like. Moreover, the articles being conveyed can consist of any discrete article, such as paper rolls, baggage, boxes, cartons, or the like. While this system can be used in a wide variety of applications, it is particularly well suited for transporting rolls of paper. The transporting of paper rolls is a relatively difficult process because paper rolls come in lengths between 8 inches and 120 inches, can weigh hundreds of pounds, and are conveyed with a minimum spacing between the rolls.

Referring to FIGS. 1A–1E, the diverter system of the invention is shown generally at 1 consisting of a first conveyor 2 and a second conveyor 4. The second conveyor 4 is arranged adjacent to the first conveyor 2 and forms a branch conveyor onto which the articles being conveyed on conveyor 2 can be diverted. The conveyors 2 and 4 can be of any type, such as endless belt or roller driven. Additionally, the second conveyor 4 can also constitute ramps, chutes, work stations or the like. The first conveyor 2 supports articles $A_1 \ldots A_n$ and travels in a first direction, as shown by arrow A, at a first speed.

Figure 3:
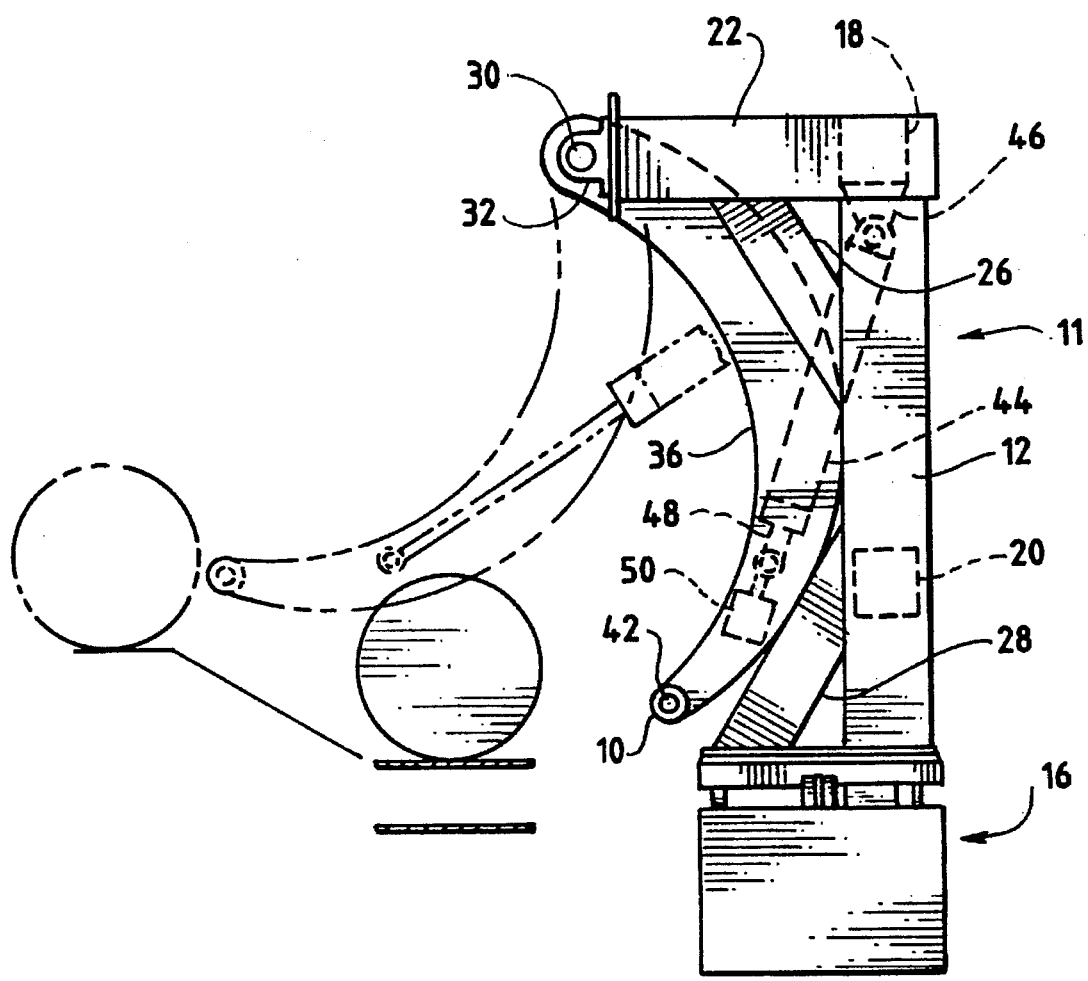
FIG. 3 is a side view of the kicker of the invention.

A kicker 10 is located adjacent the first conveyor 2 opposite second conveyor 4. Referring to FIGS. 2 and 3, kicker 10 includes a frame 11 consisting of a first vertical support 12 and a second vertical support 14 mounted on a bearing table 16. Cross members 18 and 20 extend between and connect to vertical members 12 and 14. Extending horizontally from the top of each of vertical supports 12 and 14 are kicker supports 22 and 24, respectively. Buttressing members 26 through 29 can be included to make the structure more rigid and to complete the kicker frame 11.

A pivoting shaft 30 is supported in bearings 32 and 34 in kicker supports 22 and 24, respectively, such that shaft 30 can pivot in the bearings about its longitudinal axis. Fixed to shaft 30 at either end thereof are kicker arms 36 and 38. Kicker arms 36 and 38 are substantially crescent shape, as best shown in FIG. 3, and support a kicker 10 between the ends thereof. Specifically, kicker 10 is pivotally connected to the kicker arms 36 and 38 at bearing 42. The kicker 10 is pivoted to contact one of the articles being transferred to move it from the first conveyor 2 to the second conveyor 4. Located at the end of kicker 10 is an optical sensor 45, the function of which will be hereinafter described.

To move the kicker 10, a fluid cylinder 44 is pivotally connected to cross member 18 at yoke 46. The piston rod 48 of cylinder 44 is pivotally connected to cross member 50 where cross member 50 is fixed at either end to kicker arms 36 and 38. When cylinder 44 is retracted, the kicker arms are in the solid line position of FIG. 2 and when the cylinder is expanded, as shown in dashed line in FIG. 2, the kicker arms are pivoted such that kicker 10 contacts to article to move it from conveyor 2 to conveyor 4. While conveyor 4 is illustrated as a raised ramp, in FIG. 3 it will be appreciated that it can be any type of conveyor, chute or work station.

The kicker 10 is mounted on bearing table 16 as previously described. Bearing table 16 consists of a support surface 60 on which vertical supports 12 and 14 are mounted. Surface 60 is supported on bearings 62 such that the surface can freely slide horizontally relative to conveyor 2. A reversible motor 66 is connected to surface 60 by a transmission member 64 such that when motor 66 is activated, member 64 can be reciprocated to move surface 60 horizontally, parallel to conveyor 2 as shown by arrow A in FIG. 2. Motor 66 is synchronized with the drive for conveyor 2 such that the kicker is moved in the direction of arrow A at the same speed at which the articles are conveyed on conveyor 2.

Figure 1A:
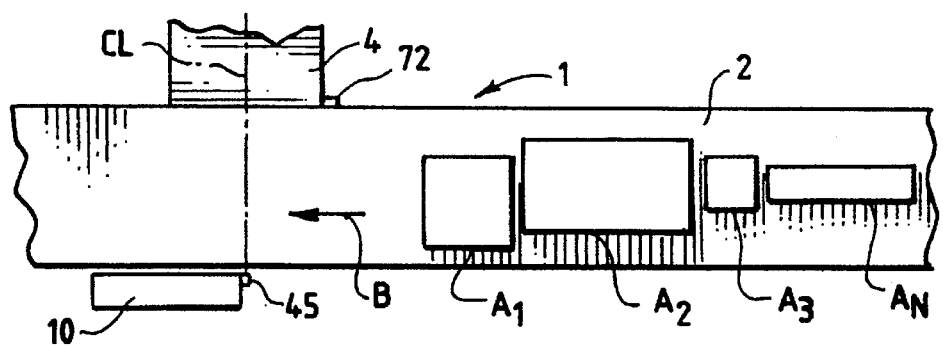
FIGS. 1A–1E show the diverter system of the invention in operation.

The operation of the kicker system of the invention will now be described with reference to FIGS. 1A–1E. Referring to FIG. 1A, the kicker 10 is shown in its start position relative to conveyors 2 and 4. By "start position" it is meant that the fluid cylinder 44 is retracted to the solid line position of FIG. 2 and the bearing table 16 is oriented such that the lead edge of kicker 10 carrying sensor 45 is aligned with the centerline CL of conveyor 4. A limit switch 67 is provided on bearing table 16 to properly locate the kicker 10 in the proper position. With the kicker 10 stationary in the start position, conveyor 2 is actuated to convey the articles 1 in the direction of Arrow B.

Figure 1B:
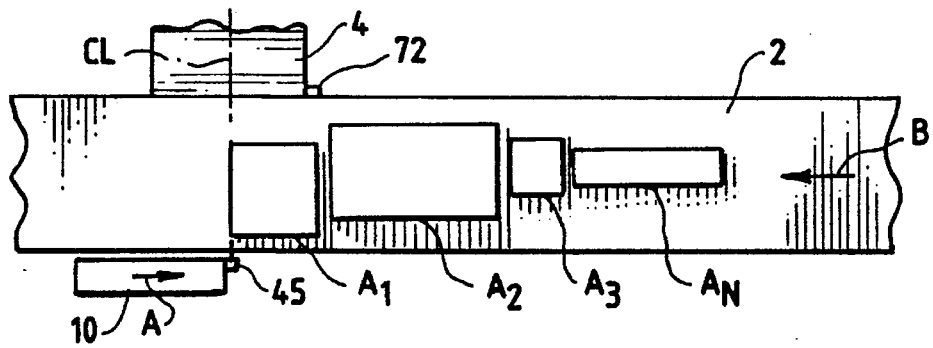

Referring to FIG. 1B, when the lead edge of the first article A1 reaches the centerline CL of conveyor 4, sensor 45 (because it is aligned with the centerline) will detect article A1 and will deliver a signal to the microprocessor control for the conveyor system indicative thereof. Upon receipt of this signal, the microprocessor activates motor 66 to move the kicker 10 in the direction of Arrow A. As previously explained, the speed of motor 66 is synchronized with the speed of conveyor 2 such that the kicker 10 is moved in the direction of Arrow A at the same speed that the articles are being conveyed on conveyor 2 in the direction of Arrow B.

Figure 1C:
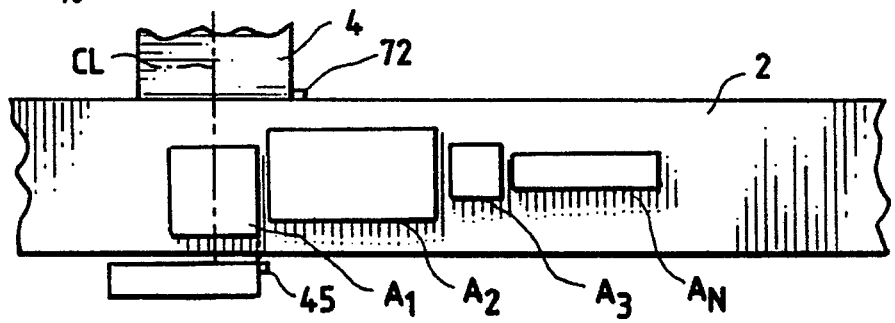

The relative movement of article A1 and kicker 10 causes the trailing edge of article A1 to pass sensor 45, as best shown in FIG. 1C, such that the sensor sends a second signal to the system microprocessor. The microprocessor upon receipt of this second signal stops conveyor 2 and kicker 10. In this position, the article A1 is positioned with its center aligned with the centerline CL of conveyor 4. In other words, when sensor 45 detects the trailing edge of article A1, one half of the article will have moved beyond centerline CL as illustrated. This is true regardless of the size of the article or the speed at which conveyor 2 is run so long as kicker 10 is moved in the direction opposite to conveyor 2, but at the same speed.

Figure 1D:
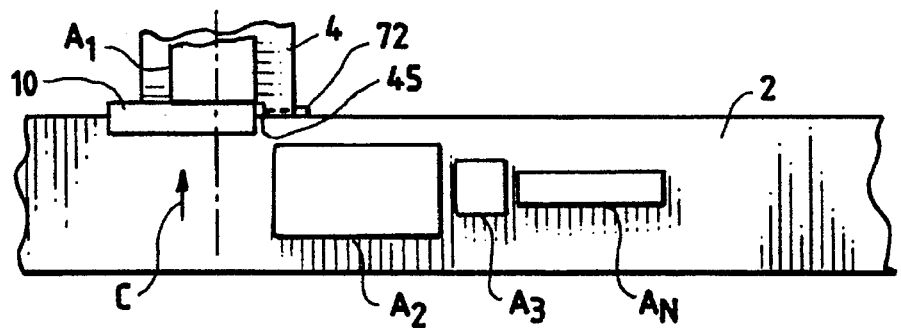
Figure 1E:
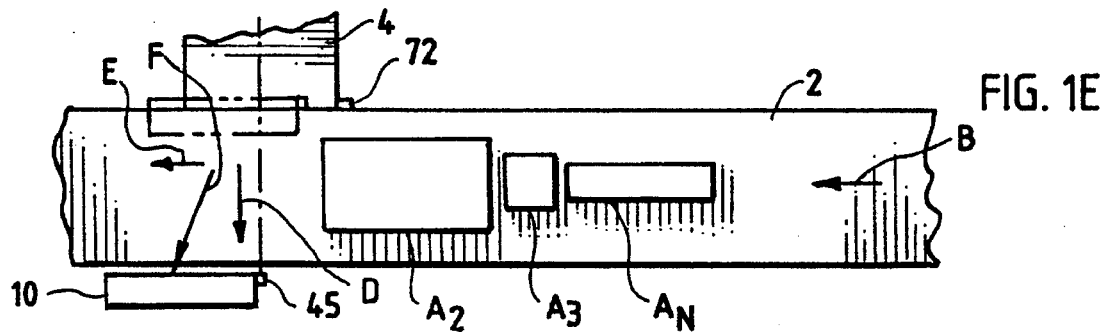

Once conveyor 2 is stopped, the microprocessor actuates cylinder 44 to move the kicker transversely to the conveyor 2 (see Arrow C) where it contacts article A1 and diverts it onto conveyor 4, as best shown in FIG. 1D. A second optical sensor 72 is located at the junction between conveyor 2 and conveyor 4. When sensor 72 detects the trailing edge of article A1, it sends a signal to the system microprocessor.

The system microprocessor, upon receipt of this second signal indicating that the article has been transferred to conveyor 4, restarts conveyor 2 to again move the articles as indicated by Arrow B. Simultaneously with the start up of conveyor 2, the microprocessor retracts cylinder 44 to move kicker 10 as shown by Arrow D and reverses motor 66 to retract bearing table 66 to its start position as shown by Arrow E. Bearing table 66 is moved in the direction of Arrow E at at least the same speed as conveyor 2 is run, such that article AZ does not contact kicker 10. The net effect of the retracting of cylinder 44 and the retracting of bearing table 66 is to move the kicker 10 as shown by Arrow F to its start position. When the kicker 10 reaches the start position with sensor 45 aligned with centerline CL, motor 66 is deactivated until the leading edge of article 16 is detected by sensor 45 at which time the entire process is repeated.

The diverter system of the invention reduces cycle time because while the kicker 10 is retracted (shown in FIG. 1E), the conveyor 2 is restarted. In other words, the system does not have to wait for kicker 10 to be fully retracted before the conveyor 2 is restarted.

The system also is able to locate the center of the article relative to conveyor 4 without requiring complicated calculations or a multiplicity of sensors. By moving, the kicker 10 opposite to the direction of travel of the article at the same speed, a single sensor 45 can be used and the need for any mathematical calculations is eliminated.

Finally, the system can divert even closely spaced articles. It is only necessary for the articles to be spaced a distance sufficient for the sensor 45 to detect the trailing edge of the article. Because the conveyor 2 is stopped when the leading edge of kicker 10 is aligned with the trailing edge of the article, virtually no clearance need be provided between articles to allow passage of kicker 10.

While the present invention has been described in the context of a preferred embodiment, it is not to be limited to the foregoing description, because many variations thereof may be evident to one skilled in the art and are intended to be encompassed in the present invention, as set forth in the following claims.

What is claimed is:

1. A method for diverting articles having a leading edge and a trailing edge from a first conveyor to a second conveyor comprising the steps of:

(a) moving a first conveyor means to convey the articles in a first direction at a first speed;

(b) providing a second conveyor means adjacent the first conveyor;

(c) providing a sensor aligned with the center line of the second conveyor for detecting the leading edge;

(d) providing a kicker for moving the article from the first conveyor means to the second conveyor means, said kicker being positioned with a known point of the kicker aligned with the center line of the second conveyor;

(e) upon detecting the leading edge of the article, moving the kicker in a second direction opposite to the first direction at the given speed;

(f) detecting when the trailing edge of the article is aligned with the known point;

(g) upon completing step (f), stopping the first conveyor and moving the kicker in a third direction relative to the first conveyor to transfer the article from the first conveyor to the second conveyor; and (h) restarting the first conveyor and moving the kicker in a fourth direction opposite to the third direction and in the first direction at at least the given speed.

2. A conveyor diverter system, comprising:
(a) a first conveyor means for moving a plurality of articles in a first direction at a given speed, each article having a leading edge and a trailing edge;
(b) a second conveyor means located adjacent the first conveyor means for receiving articles from the first conveyor means; and
(c) means for diverting articles from the first conveyor means to said second conveyor means, comprising:
  (i) a kicker for contacting the articles;
  (ii) first means for moving said kicker parallel to the first conveyor means and at the same speed, but in a direction opposite to the first direction; and
  (iii) second means for extending and retracting the kicker transversely to the first conveyor; and
(d) means for controlling the means for diverting including a sensor mounted to said kicker for signalling said means for controlling when the leading and trailing edges of an article have been detected.

3. The conveyor diverter system of claim 2, wherein said first means is actuated upon detection of the leading edge.

4. The conveyor diverter system of claim 2, wherein said second means is actuated upon detection of the trailing edge to extend the kicker and divert the article from the first conveyor means to the second conveyor means.

5. The conveyor diverter system of claim 2, wherein the first conveyor means is stopped upon detection of the leading edge.

6. The conveyor diverter system of claim 2 where in the means for controlling further includes a microprocessor for receiving the signals to control the first and second means.

7. The conveyor diverter system of claim 1, further including means for determining when the article has been diverted to the second conveyor means.

8. The conveyor diverter system of claim 5, wherein after the articles has been diverted to the second conveyor, the first means moves the kicker parallel to the first conveyor and at a speed at least as great as the given speed in the first direction, the second means retracts the kicker and the first conveyor means is restarted.

9. A conveyor diverter system, comprising:
(a) a first conveyor means for moving a plurality of articles in a first direction at a given speed, each article having a leading edge and a trailing edge;
(b) a second conveyor means located adjacent the first conveyor means for receiving articles from the first conveyor means;
(c) means for diverting articles from the first conveyor means to the second conveyor means, comprising:
  (i) a kicker for contacting the article of said kicker having an upstream end and a downstream end;
  (ii) a sensor means for detecting the leading and trailing edges;
  (iii) drive means for: 1) moving the sensor and kicker parallel to the first conveyor means and at the given speed in the first direction and for moving the kicker in a direction opposite to the first direction at at least the given speed, said sensor being aligned with the upstream end of the kicker; and 2) for extending and retracting the kicker; and
(d) means for controlling the drive means in response to the detection of the leading and trailing edges.

10. The diverter system according to claim 9, wherein the sensor is mounted to the kicker.

11. The diverter system according to claim 9, wherein the means for controlling operates the drive means to move the sensor and kicker in the second direction upon detection of the leading edge.

12. The diverter system according to claim 9, wherein the means for controlling operates the drive means to extend the kicker upon detection of a trailing edge to divert the article to the second conveyor means.

13. The diverter system according to claim 9, wherein the means for controlling operates the drive means to move the kicker in the first direction at at least the given speed and to retract the kicker after the article has been diverted to the second conveyor means.

14. The diverter system according to claim 9, wherein the first conveyor means is stopped upon detection of the trailing edge.

* * * * *